US012027098B2

(12) United States Patent
Kim et al.

(10) Patent No.: US 12,027,098 B2
(45) Date of Patent: Jul. 2, 2024

(54) DISPLAY DEVICE AND METHOD OF DRIVING THE SAME

(71) Applicant: Samsung Display Co., LTD., Yongin-si (KR)

(72) Inventors: Hyunsu Kim, Hwaseong-si (KR); Jundal Kim, Asan-si (KR); Kyungyoul Min, Hwaseong-si (KR); Jongman Bae, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/227,187

(22) Filed: Jul. 27, 2023

(65) Prior Publication Data

US 2024/0038135 A1 Feb. 1, 2024

(30) Foreign Application Priority Data

Aug. 1, 2022 (KR) ........................ 10-2022-0095388

(51) Int. Cl.
*G09G 3/20* (2006.01)
*G09G 3/32* (2016.01)

(52) U.S. Cl.
CPC ............. *G09G 3/2092* (2013.01); *G09G 3/32* (2013.01); *G09G 2310/061* (2013.01);
(Continued)

(58) Field of Classification Search
CPC ....... G09G 2310/08; G09G 2310/0286; G09G 2310/0275; G09G 2310/0267; G09G 2310/027; G09G 2310/0262; G09G 3/20; G09G 3/3648; G09G 3/2014; G09G 3/3688; G09G 3/36; G09G 3/3677; G09G 3/2096; G09G 3/32; G09G 3/22; G09G 3/2018;
(Continued)

(56) References Cited

U.S. PATENT DOCUMENTS

2018/0103231 A1* 4/2018 Ahn ........................ G09G 5/005
2020/0014391 A1* 1/2020 Kim ........................ G09G 5/008
(Continued)

FOREIGN PATENT DOCUMENTS

KR 100762178 B1 10/2007
KR 102366556 B1 2/2022
KR 1020220022335 A 2/2022

*Primary Examiner* — Dong Hui Liang
(74) *Attorney, Agent, or Firm* — CANTOR COLBURN LLP

(57) ABSTRACT

A display device includes a driving controller, a display panel, and an emission driver. The driving controller generates a second clock signal having second pulses in response to a first clock signal having first pulses from an external device. The display panel includes pixels. The emission driver generates an emission signal having third pulses in response to the second clock signal and applies the emission signal to the pixels. The driving controller compares a number of the first pulses and a number of the second pulses, with a first reference value, and a second reference value, and sets a compensation value of the number of the second pulses, and the driving controller compensates for the second clock signal by adjusting the number of the second pulses existing in one horizontal time based on the compensation value in a vertical blank period of the frame period.

20 Claims, 10 Drawing Sheets

(52) U.S. Cl.
CPC . *G09G 2310/08* (2013.01); *G09G 2320/0233* (2013.01); *G09G 2330/023* (2013.01); *G09G 2340/0435* (2013.01)

(58) Field of Classification Search
CPC ........... G09G 3/3233; G09G 2330/021; G09G 5/008; G09G 5/18; G09G 2320/0276; G09G 2320/043
See application file for complete search history.

(56) References Cited

U.S. PATENT DOCUMENTS

2022/0189363 A1* 6/2022 Jung ........................ G09G 3/20
2022/0215798 A1* 7/2022 Pyun .................... G09G 3/2096

* cited by examiner

FIG. 7

| 1H Period (6551.4ns) | # of FIRST CLOCK SIGNAL(1UI)<1.5Gbps> | # of SECOND CLOCK SIGNAL<150MHz> | # of SECOND CLOCK SIGNAL<145.5MHz> |
|---|---|---|---|
| | 9827ea | 983ea | 953ea |
| SECOND CLOCK SIGNAL 100 Period (150MHz) | 1000ea | | |
| SECOND CLOCK SIGNAL 100 Period (145.5MHz) | 1030ea | | |

FIRST CLOCK SIGNAL Count +3%

SECOND CLOCK SIGNAL Count -3%

FIG. 9

| MEASURING THE NUMBER OF FIRST PULSES DURING REFERENC PERIOD OF THE SECOND CLOCK SIGNAL | ADJUSTING THE NUMBER OF SECOND PULSES EXISTING IN ONE HORIZONTAL TIME |
|---|---|
| +3.0% | -3.0% |
| +2.9% | -2.9% |
| ... | ... |
| +0.1% | -0.1% |
| Default | Default |
| -0.1% | +0.1% |
| ... | ... |
| -2.9% | +2.9% |
| -3.0% | +3.0% |

DISPLAY DEVICE AND METHOD OF DRIVING THE SAME

This application claims priority to Korean Patent Application No. 10-2022-0095388, filed on Aug. 1, 2022, and all the benefits accruing therefrom under 35 U.S.C. § 119, the content of which in its entirety is herein incorporated by reference.

BACKGROUND

1. Field

Embodiments of the invention relate to a display device and a method of driving the display device. More particularly, embodiments of the invention relate to a display device capable of performing an adaptive refresh and a method of driving the display device.

2. Description of the Related Art

Recently, a display device with reduced power consumption is desired, and in particular, a portable or mobile display device such as a smart phone and a tablet computer may be desired to have reduced power consumption. In order to reduce the power consumption of the display device, an adaptive refresh or an adaptive refresh panel (ARP) technology which refreshes a display panel at a frequency lower than an input frequency of input image data has been developed.

SUMMARY

In a display device to which an adaptive refresh panel technology is applied, since there is no signal transmission between a host processor and a driving controller in a vertical blank period, a first clock signal from the host processor and a second clock signal from the driving controller may not be synchronized with each other. In such a display device, since a driving frequency of the display panel is not constant, intervals between pulses of an emission signal is not constant, and thus change of an unintended luminance may be perceived by a viewer.

Therefore, a method of changing a voltage or the like to change a frequency of the second clock signal among methods of compensating for the second clock signal to solve this issue may generate a delay time until the second clock signal is compensated for by gradually increasing or decreasing the frequency of the second clock signal to a target frequency.

Embodiments of the invention provide a display device which can prevent a change in luminance from being perceived by a user's eyes while performing an adaptive refresh.

Embodiments of the invention provide a method of driving the display device.

According to embodiments, a display device includes a driving controller, a display panel, and an emission driver. In such embodiments, the driving controller generates a second clock signal having second pulses in response to a first clock signal having first pulses from an external device. In such embodiments, the display panel includes pixels. In such embodiments, the emission generates an emission signal having third pulses in response to the second clock signal and applies the emission signal to the pixels. In such embodiments, the driving controller compares a number of the first pulses and a number of the second pulses, which are measured in an active period of a frame period, with a first reference value, which is the number of the first pulses during a reference period of the second clock signal, and a second reference value, which is the number of the second pulses during one horizontal time of the second clock signal and to set a compensation value of the number of the second pulses, and the driving controller compensates for the second clock signal by adjusting the number of the second pulses existing in the one horizontal time in a vertical blank period of the frame period based on the compensation value.

In an embodiment, the driving controller may maintain intervals between the third pulses constant by adjusting the number of the second pulses existing in the one horizontal time.

In an embodiment, the driving controller may be compensate for the second clock signal by adjusting the number of the second pulses existing in the one horizontal time by comparing the number of the first pulses and the number of the second pulses, which are measured in the active period for a same amount of time with the first reference value and the second reference value.

In an embodiment, the driving controller may set the compensation value by comparing the number of the first pulses and the number of the second pulses with the first reference value and the second reference value based on the number of the first pulses or the number of the second pulses.

In an embodiment, the driving controller may compare the number of the first pulses and the number of the second pulses, which are measured in the active period with the first reference value and the second reference value.

In an embodiment, the driving controller may compensate for the second clock signal by adjusting the number of the second pulses existing in the one horizontal time when the vertical blank period starts.

In an embodiment, the driving controller may divide the active period into reference time, and compare the number of the first pulses in the active period corresponding to an average value of the number of the first pulses measured in each of the reference time and the number of the second pulses in the entire active period corresponding to an average value of the number of the second pulses measured in each of the reference time with the first reference value and the second reference value.

In an embodiment, the driving controller may compensate for the second clock signal by adjusting the number of the second pulses existing in the one horizontal time when the vertical blank period starts.

In an embodiment, the driving controller may divide the active period into reference time, and compare the number of the first pulses in the active period corresponding to the number of the first pulses measured in a last reference time among the reference time and the number of the second pulses in the active period corresponding to the number of the second pulses measured in the last reference time among the reference time with the first reference value and the second reference value.

In an embodiment, the driving controller may compensate for the second clock signal by adjusting the number of the second pulses existing in the one horizontal time when the vertical blank period starts.

In an embodiment, the driving controller may compare the number of the first pulses and the number of the second pulses, which are measured in a part of the active period with the first reference value and the second reference value.

In an embodiment, the driving controller may compensate for the second clock signal by adjusting the number of the second pulses existing in the one horizontal time when the part of the active period ends.

In an embodiment, the driving controller may compensate for the second clock signal by adjusting the number of the second pulses existing in the one horizontal time when the vertical blank period starts.

In an embodiment, the driving controller may divide a part of the active period into reference time, and compare the number of the first pulses in the active period corresponding to an average value of the number of the first pulses measured in each of the reference time and the number of the second pulses in the active period corresponding to an average value of the number of the second pulses measured in each of the reference time with the first reference value and the second reference value.

In an embodiment, the driving controller may compensate for the second clock signal by adjusting the number of the second pulses existing in the one horizontal time when the part of the active period ends.

In an embodiment, the driving controller may compensate for the second clock signal by adjusting the number of second pulses existing in the one horizontal time based on the compensation value in a lookup table.

According to embodiments, a method of driving a display device includes setting a first reference value and a second reference value, measuring a number of first pulses of a first clock signal and a number of second pulses of a second clock signal in an active period of a frame period, setting a compensation value by comparing the number of the first pulses and the number of the second pulses with the first reference value and the second reference value and compensating for the second clock signal by adjusting the number of the second pulses one horizontal time in a vertical blank period of the frame period based on the compensation value.

In an embodiment, intervals between third pulses of an emission signal generated in response to the second clock signal may be maintained constant by adjusting the number of the second pulses existing in the one horizontal time.

In an embodiment, the compensating for the second clock signal by adjusting the number of the second pulses existing in one horizontal time may include comparing the number of the first pulses and the number of the second pulses, which are measured in the active period for a same amount of time, with the first reference value and the second reference value.

In an embodiment, the setting the compensation value may include comparing the number of the first pulses and the number of the second pulses with the first reference value and the second reference value based on the number of the first pulses or the number of the second pulses.

According to embodiments of the invention, the driving controller may compare a number of pulses of the first clock signal and a number of pulses of the second clock signal, which are measured in the active period, with the first reference value, which is the number of the pulses of the first clock signal during the reference period of the second clock signal and the second reference value, which is the number of the pulses of the second clock signal during the one horizontal time, and may set the compensation value, and may adjust the number of the pulses of the second clock signal during the one horizontal time based on the compensation value in the vertical blank period.

Therefore, in such embodiments, the first clock signal and the second clock signal may be effectively synchronized with each other by adjusting the second clock signal during the one horizontal time unlike an analog compensation method in which gradually compensate for the problem.

As a result, an unintended change in luminance, that may occur when the first clock signal from the host processor and the second clock signal from the driving controller are not synchronized with each other due to no signal transmission between a host processor and the driving controller in the vertical blank period, a driving frequency of a display panel is not constant, and the intervals between pulses of the emission signal are thereby not constant, may be effectively prevented from being perceived by a viewer, such that display quality of the display panel may be enhanced.

BRIEF DESCRIPTION OF THE DRAWINGS

FIG. 7 is a diagram illustrating an example in which the display device of FIG. 1 performs a compensation of a second clock signal.

FIG. 9 is a diagram illustrating an example in which the display device of FIG. 1 performs a compensation of a second clock signal according to a lookup table.

DETAILED DESCRIPTION

Figure 1:
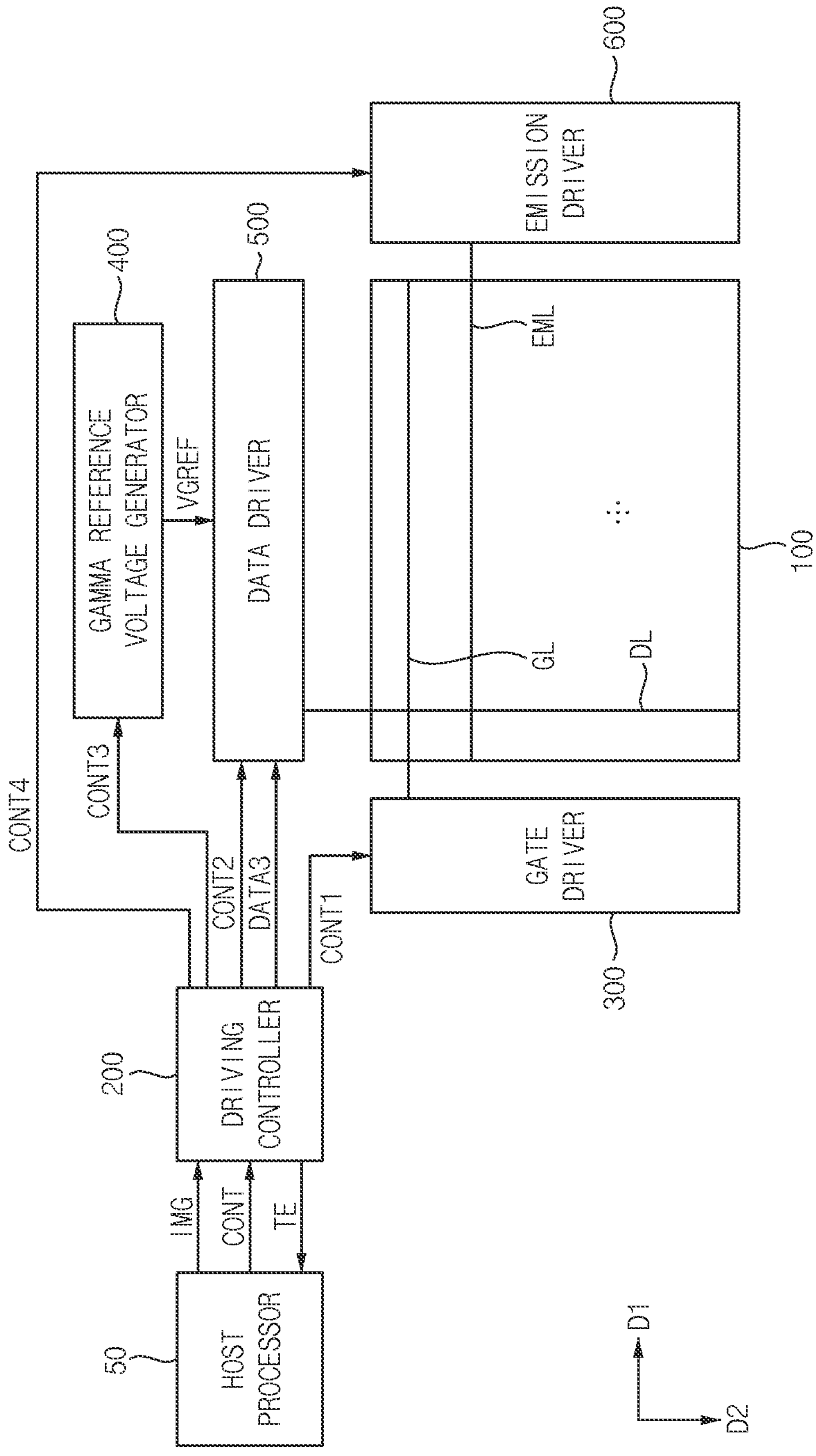
FIG. 1 is a block diagram illustrating a display device according to embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a block diagram illustrating a display device according to embodiments.

Referring to FIG. 1, an embodiment of the display device may include a display panel 100 and a display panel driver. The display panel driver may include a driving controller 200, a gate driver 300, a gamma reference voltage generator 400, a data driver 500, and an emission driver 600.

In an embodiment, for example, the driving controller 200 and the data driver 500 may be integrally formed with each other in a same module or chip. In an embodiment, for example, the driving controller 200, the gamma reference voltage generator 400, and the data driver 500 may be integrally formed with each other in a same module or chip. In an embodiment, for example, the driving controller 200, the gamma reference voltage generator 400, the data driver 500, and the emission driver 600 may be integrally formed with each other in a same module or chip. A driving module including at least the driving controller 200 and the data driver 500 which are integrally formed may be called to a timing controller embedded data driver (TED).

The display panel 100 may include a display region for displaying an image and a peripheral region disposed adjacent to the display region.

In an embodiment, the display panel 100 may be an organic light emitting diode display panel including organic light emitting diodes. In an embodiment, for example, the display panel 100 may be a quantum-dot organic light emitting diode display panel including organic light emitting diodes and quantum-dot color filters. In an embodiment, for example, the display panel 100 may be a quantum-dot nano light emitting diode display panel including nano light emitting diodes and quantum-dot color filters.

The display panel may 100 include gate lines GL, data lines DL, emission lines EML and pixels electrically connected to each of the gate lines GL, the data lines DL and the emission lines EML. The gate lines GL may extend in a first direction D1, the data lines DL may extend in a second direction D2 crossing the first direction D1, and the emission lines EML may extend in the first direction D1.

The driving controller 200 may generate a tearing effect signal TE and output the tearing effect signal TE to an external device (e.g., a host or an application processor). The driving controller 200 may receive an input image data IMG and an input control signal CONT from the external device generated in response to the tearing effect signal TE. In an embodiment, for example, the input image data IMG may include red image data, green image data, and blue image data. The input image data IMG may include white image data.

The input image data IMG may include magenta image data, yellow image data, and cyan image data. The input control signal CONT may include a first clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4 and a data signal DATA based on the input image data IMG and the input control signal CONT The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of a gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600. The fourth control signal CONT4 may include a second clock signal.

The gate driver 300 may generate gate signals driving the gate lines GL in response to the first control signal CONT1 received from the driving controller 200. The gate driver 300 may output gate signals to the gate lines GL. In an embodiment, for example, the gate driver 300 may sequentially output the gate signals to the gate lines GL. In an embodiment, for example, the gate driver 300 may be mounted on the peripheral region of the display panel 100. In an embodiment, for example, the gate driver 300 may be integrated on the peripheral region of the display panel 100.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may be used to convert the data signal DATA into an analog data voltage.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into the analog data voltage by using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

FIG. 1 illustrates an embodiment where the gate driver 300 is disposed on a first side of the display panel 100 and the emission driver 600 is disposed on a second side of the display panel 100 for convenience of description, but the invention is not limited thereto. In an alternative embodiment, for example, both the gate driver 300 and the emission driver 600 may be disposed on the first side of the display panel 100. In another alternative embodiment, for example, the gate driver 300 and the emission driver 600 may be integrally formed with each other.

Figure 2:
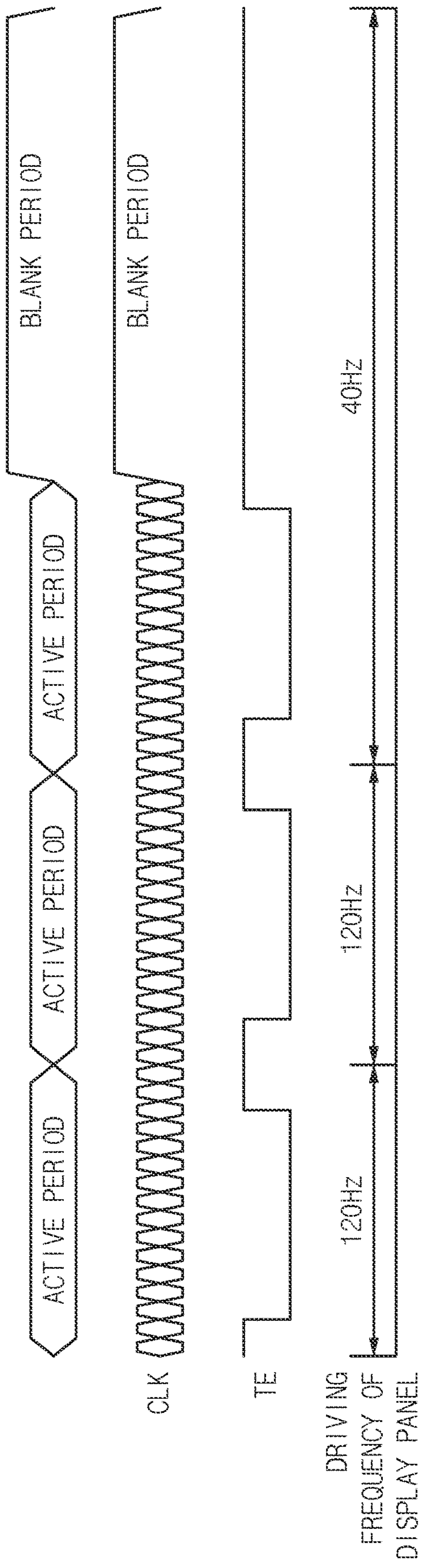
FIG. 2 is a timing diagram illustrating an example in which the display device of FIG. 1 performs an adaptive refresh.

FIG. 2 is a timing diagram illustrating an example in which the display device of FIG. 1 performs an adaptive refresh.

Referring to FIG. 1 and FIG. 2, an embodiment of the display device may be driven in frame unit or on a frame-by-frame basis, a frame period may include an active period and a vertical blank period, the first clock signal may include first pulses, and the second clock signal may include second pulses. The driving controller 200 may generate the tearing effect signal TE and output the tearing effect signal TE to the host processor 50. In an embodiment, the driving controller 200 may generate the tearing effect signal TE in a still image mode (e.g., a command mode of Mobile Industry Processor Interface (MIPI)) and output the tearing effect signal TE to the host processor 50. The host processor 50 may generate the input image data IMG and the input control signal CONT in response to the tearing effect signal TE and output the input image data IMG and the input control signal CONT to the driving controller 200. The input control signal CONT may include the first clock signal. In such an embodiment, when the tearing effect signal TE is at a low level, the host processor 50 may generate the input image data IMG and the input control signal CONT to output the input image data IMG and the input control signal CONT to the driving controller 200. In such an embodiment, when the tearing effect signal TE is at a high level, the host processor 50 may not generate the input image data IMG and the input control signal CONT to output the input image data IMG and the input control signal CONT to the driving controller 200. The driving controller 200 may adjust a length of the vertical blank period based on the tearing effect signal TE, and may adjust a driving frequency of the display panel 100 by adjusting the length of the vertical blank period. The driving controller 200 may include a frame memory. The frame memory may store the input image data IMG received from the host processor 50. The input image data IMG stored in the frame memory may be provided to the display panel 100.

in an embodiment, the driving controller 200 may not generate the tearing effect signal TE in a moving image mode (e.g., a video mode of MIPI). Accordingly, the host processor 50 may generate the input image data IMG and the input control signal CONT independently of the tearing effect signal TE, and output the input image data IMG and the input control signal CONT to the driving controller 200. In moving image mode, the input control signal CONT may include the first clock signal. Also, unlike the still image mode, the input image data IMG may not be stored in the frame memory in the video mode, and the input image data IMG may be provided to the display panel 100.

Figure 3:
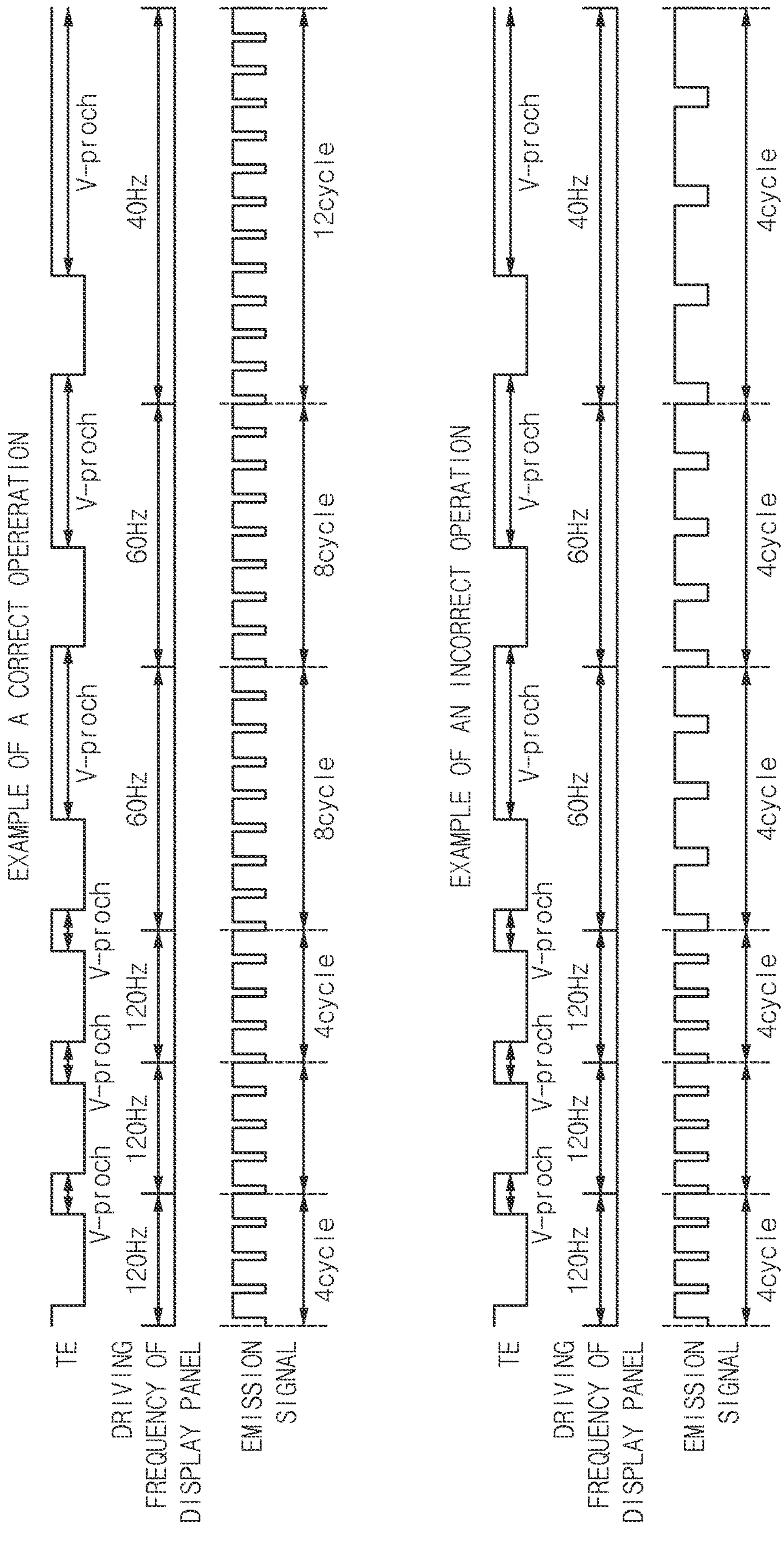
FIG. 3 is a timing diagram illustrating an example of a correct operation and an example of an incorrect operation of an emission signal when the display device of FIG. 1 performs the adaptive refresh of FIG. 2.

FIG. 3 is a timing diagram illustrating an example of a correct operation and an example of an incorrect operation of an emission signal when the display device of FIG. 1 performs the adaptive refresh of FIG. 2.

Referring to FIGS. 1 to 3, in an embodiment, the host processor 50 may generate the first clock signal in response to the tearing effect signal TE, output the first clock signal to the driving controller 200, the driving controller 200 may generate the second clock signal in response to the first clock signal and output the second clock signal to the emission driver 600, and the emission driver 600 may generate the emission signal in response to the second clock signal. The emission signal may include third pulses.

In such an embodiment, the second clock signal generated by the driving controller 200 may have a deviation due to an external influence (e.g., an influence of temperature), the first clock signal and the second clock signal may not be synchronized with each other, thus the emission signal may be affected by the second clock signal having the deviation. In such an embodiment, unlike the active period, the driving controller 200 may not receive the first clock signal from the host processor 50 in the vertical blank period, and thus, even if the first clock signal and the second clock signal are not synchronized with each other, the second clock signal having the deviation may not be compensated for. Accordingly, the emission signal generated in response to the second clock signal may be affected by the external influence, may not maintain constant intervals between the third pulses, and change of an unintended luminance may be perceived by a viewer. Therefore, the intervals between the third pulses are desired to be maintained constant even if the driving frequency of the display panel 100 changes.

In an embodiment, for example, when the emission signal includes 4 cycles at a driving frequency of 120 hertz (Hz) of the display panel 100, the driving controller 200 may adjust a length of the vertical blank period based on the tearing effect signal TE and the driving frequency of the display panel 100 may be changed to 60 Hz. In an embodiment, even in a case where the driving frequency of the display panel 100 changes to 60 Hz, the emission signal may include 8 cycles and the intervals between the third pulses may be maintained constant. Accordingly, change of the unintended luminance may not be perceived by the user's eyes.

Figure 4:
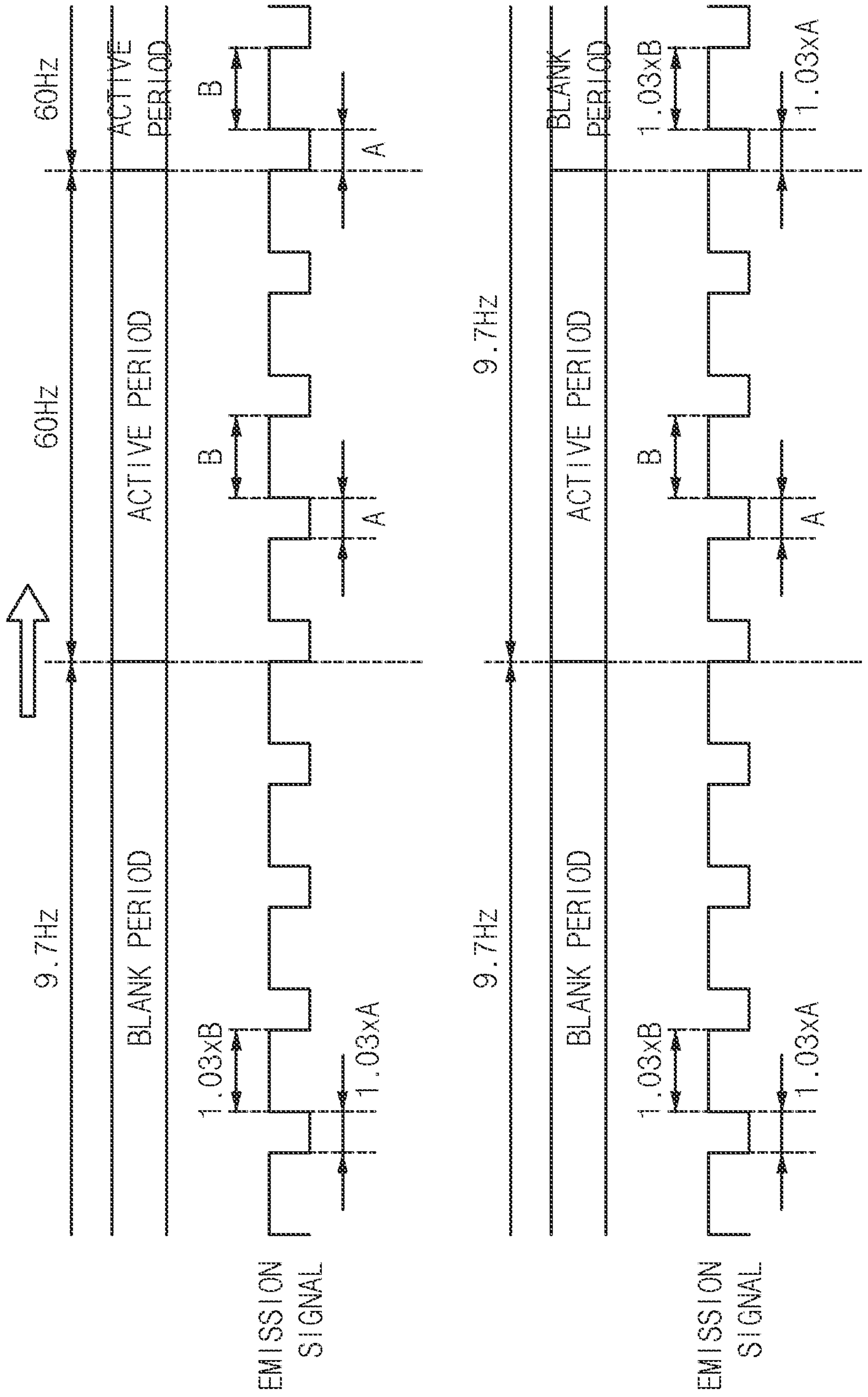
FIG. 4 is a timing diagram illustrating an example of the incorrect operation of an emission signal when the display device of FIG. 1 performs the adaptive refresh of FIG. 2 and the emission signal when the display device does not perform the adaptive refresh.

FIG. 4 is a timing diagram illustrating an example of the incorrect operation of an emission signal when the display device of FIG. 1 performs the adaptive refresh of FIG. 2 and the emission signal when the display device does not perform the adaptive refresh.

Referring to FIGS. 1 to 4, since the second clock signal which has the deviation due to the external influence and is not synchronized with the first clock signal, the intervals between the third pulses may not be constant and the second clock signal may not be compensated for. Thus the emission signal may be affected by the second clock signal having the deviation. This problem may occur not only when the driving frequency changes but also when the driving frequency does not change.

In an embodiment, for example, the emission signal, which has deviation from the driving frequency of 9.7 Hz of the display panel 100 and is not compensated for, may include a low level length of 1.03×A and a high level length of 1.03×B in the vertical blank period.

In an embodiment, even in a case where the driving frequency of the display panel 100 changes from 9.7 Hz to 60 Hz, the driving controller 200 may receive the first clock signal from the host processor 50 in the active period, compensate for the second clock signal, and the emission signal may include a low level length of A and a high level length of B.

In an embodiment, for example, the emission signal, which has a deviation from the driving frequency of 9.7 Hz of the display panel 100 and is not compensated for, may include the low level length of 1.03×A and the high level length of 1.03×B in the vertical blank period. When the driving frequency of the display panel 100 is constantly maintained at 9.7 Hz and changes from the vertical blank period to the active period, the driving controller 200 may receive the first clock signal from the host processor 50 and compensate for the second clock signal, the emission signal may include the low level length of A and the high level length of B. In addition, when the driving frequency of the display panel 100 is constantly maintained at 9.7 Hz and changes from the active period to the vertical blank period, the second clock signal has the deviation and the emission signal based on the non-compensated second clock signal may have the low level length of 1.03×A and the high level length of 1.03×B in the vertical blank period.

As such, when the intervals between the third pulses is not constant due to the second clock signal having the deviation due to the external influence in the vertical blank period, the unintended luminance change may be perceived by the user's eyes.

Therefore, in an embodiment of the invention, the driving controller 200 may set a compensation value of the second clock signal based on the first clock signal and the second clock signal in the active period and compensate for the second clock signal in the vertical blank period to prevent undesired issue that occur when the host processor 50 does not output the first clock signal to the driving controller 200 in the vertical blank period and the driving controller 200 does not compensate for the second clock signal.

Figure 5:
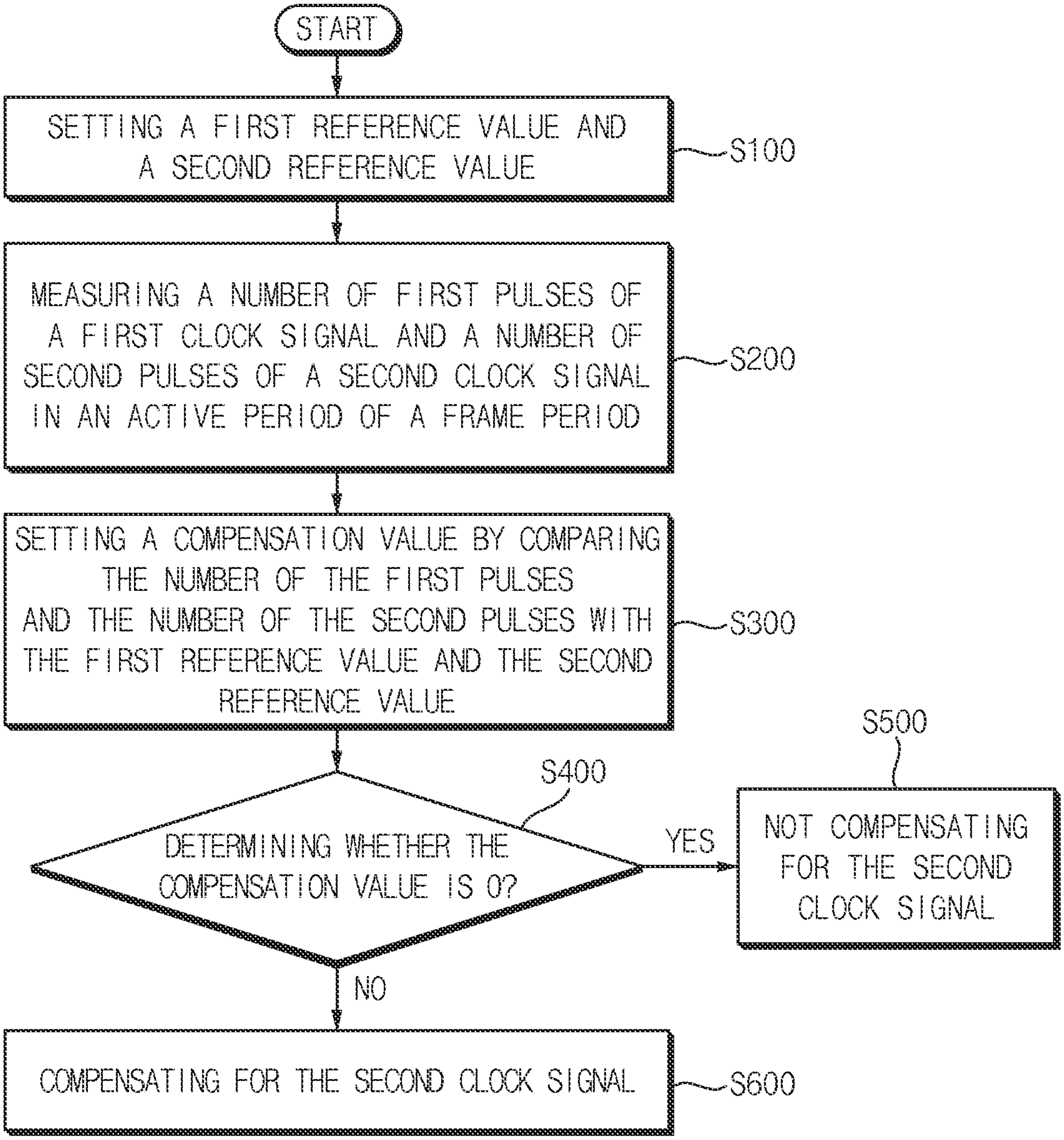
FIG. 5 is a flowchart illustrating an embodiment of a method of driving the display device of FIG. 1.
Figure 6:
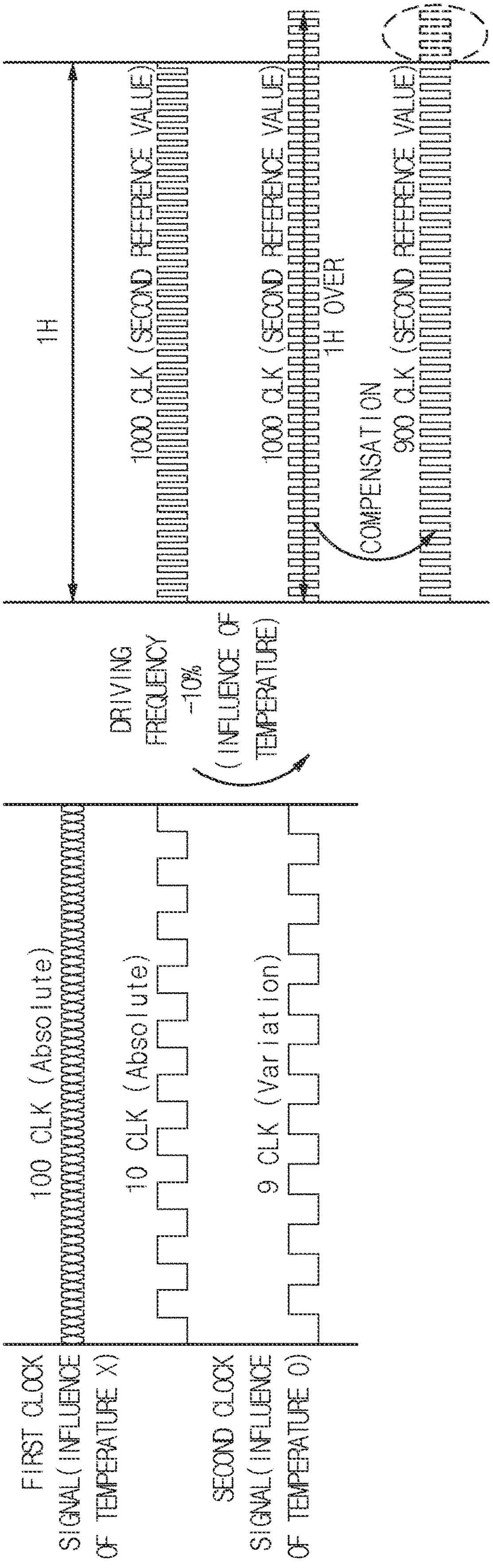
FIG. 6 is a diagram illustrating an example in which the display device of FIG. 1 performs a compensation of a second clock signal.

FIG. 5 is a flowchart illustrating an embodiment of a method of driving the display device of FIG. 1. FIG. 6 is a diagram illustrating an example in which the display device of FIG. 1 performs compensation of the second clock signal.

Referring FIGS. 1 to 6, an embodiment of a method of driving the display device may include setting a first reference value and a second reference value (S100), measuring the number of first pulses and the number of second pulses in the active period of a frame period (S200), setting a compensation value by comparing the number of the first pulses and the number of the second pulses with the first reference value and the second reference value (S300), determining whether the compensation value is 0 (S400), if the compensation value is 0, not compensating for the second clock (S500), and if the compensation value is not 0, compensating for the second clock by adjusting the number of the second pulses existing in one horizontal time based on the compensation value in the vertical blank period of the frame period (S600).

In an embodiment, the driving controller may set the first reference value and the second reference value. The driving controller 200 may receive the first clock signal from the host processor 50, and generate the second clock signal including the second pulses in response to the first clock signal in the frame period which includes the active period and vertical blank period. The host processor 50 may be hardly affected by the external influence (e.g., temperature influence) and generate the constant first clock signal. However, the driving controller 200 may generate the second clock signal having the deviation due to the external influence. Therefore, in an embodiment, the driving controller 200 may set the first reference value and the second reference value, which are used as comparison targets before compensating for the second clock signal having the deviation due to the external influence to compensate the deviation of the second clock signal. In an embodiment, the driving controller 200 may set the second reference value to the number of second pulses during one horizontal time when driving controller 200 is not affected by the external influence in the active period. The driving controller 200 may set the first reference value to the number of first pulses during a reference period of the second clock signal when driving controller 200 is not affected by the external influence in the active period.

In an embodiment, the driving controller 200 may measure the number of the first pulses and the number of the second pulses in the active period. Since the driving controller 200 does not measure the number of the first pulses in the vertical blank period, the driving controller 200 may measure the number of the first pulses and the number of the second pulses in the active period.

In an embodiment, the driving controller 200 may set the compensation value by comparing the number of the measured first pulses and the number of the measured second pulses with the first reference value and the second reference value, may determine whether the compensation value is 0, if the compensation value is 0, may not compensate for the second clock, and if the compensation value is not 0, may compensate for the second clock. Specifically, the driving controller 200 may compensate for the second clock signal by adjusting the number of the second pulses existing in the one horizontal time by comparing the number of the first pulses and the number of the second pulses, measured in the active period for a same amount of time with the first reference value and the second reference value. In an embodiment, for example, when the driving controller 200 is not affected by the external influence, the driving controller 200 may measure the number of the first pulses to 100 for a certain period of time and measure the number of the second pulses to 10 for the same amount of time. That is, when the driving controller 200 is not affected by the external influence, the driving controller 200 may set the first reference value to the number of the first pulses of 10 during one cycle of the second clock signal. The first clock signal may be synchronized with the second clock signal. In addition, when the driving controller 200 is not affected by the external influence and measures the number of the second pulses as 1000, the driving controller 200 may set the second reference value to 10000 existing in the one horizontal time based on the first reference value. That is, the second reference value may be 1000.

In an embodiment, because the second clock signal is slowed down or delayed by the external influence, when the number of first pulses is 100, the number of second pulses may be 9 and the first clock signal and the second clock signal are may not be synchronized. In an embodiment, for example, when the driving controller 200 is not affected by the external influence, the number of second pulses during the one horizontal time may be 1000. In an embodiment, for example, when the second clock signal is slowed down due to the external influence, the number of second pulses may be 900 during the one horizontal time period. Therefore, the second pulses of 1000 may be output during a time period longer than the one horizontal time. Thus, the first clock signal and the second clock signal may not be synchronized with each other. In an embodiment, the driving controller 200 may set the number of second pulses existing in the one horizontal time to 900 to synchronize the first clock signal and the second clock signal with each other.

Accordingly, the driving controller 200 may prevent an unintended change in luminance that may occur when the first clock signal and the second clock signal are not synchronized with each other, the driving frequency of the display panel 100 is not constant, the intervals between the third pulses are thereby not constant, from being perceived by a viewer, by adjusting the number of the second pulses existing in the one horizontal time, such that the display quality of the display panel 100 may be enhanced.

FIG. 7 is a diagram illustrating an example in which the display device of FIG. 1 performs the compensation of the second clock signal.

Referring to FIGS. 1 to 7, in an embodiment, the driving controller 200 may compare the number of the first pulses and the number of the second pulses, which are measured in the active period of the frame period, with the first reference value, which is the number of the first pulses during the reference period of the second clock signal, and the second reference value, which is the number of the second pulses during the one horizontal time, and set the compensation value of the number of the second pulses based on the number of the first pulses.

In an embodiment, for example, when the driving controller 200 is not affected by the external influence, the number of the second pulses may be 989. In an embodiment, for example, when the driving controller is affected by the external influence, the number of the second pulses may be 953. The driving controller 200 may reduce the number of second pulses existing in the one horizontal time by 3% from 983 to 953.

The driving controller 200 may compare the number of the first pulses and the number of the second pulses, measured in the active period of the frame period with the first reference value which is the number of the first pulses during the reference period of the second clock signal and the second reference value which is the number of the second pulses during the one horizontal time and set the compensation value of the number of the second pulses based on the number of the second pulses.

In an embodiment, for example, when the driving controller is not affected by the external influence, the number of first pulses during 100 cycles of the second clock signal may be 1000. In an embodiment, for example, when the driving controller is affected by the external influence, the number of the measured first pulses during 100 cycles of the second clock signal may be 1030. The number of the first pulses may increase by 3%. The driving controller 200 may reduce the number of second pulses during the one horizontal time by 3%.

Accordingly, in an embodiment, the driving controller 200 may prevent an unintended change in luminance that may occur when the first clock signal and the second clock signal are not synchronized with each other, the driving frequency of the display panel 100 is not constant, and the intervals between the third pulses are thereby not constant from being perceived by a viewer, by adjusting the number of the second pulses during the one horizontal time, such that the display quality of the display panel 100 may be enhanced.

Figure 8:
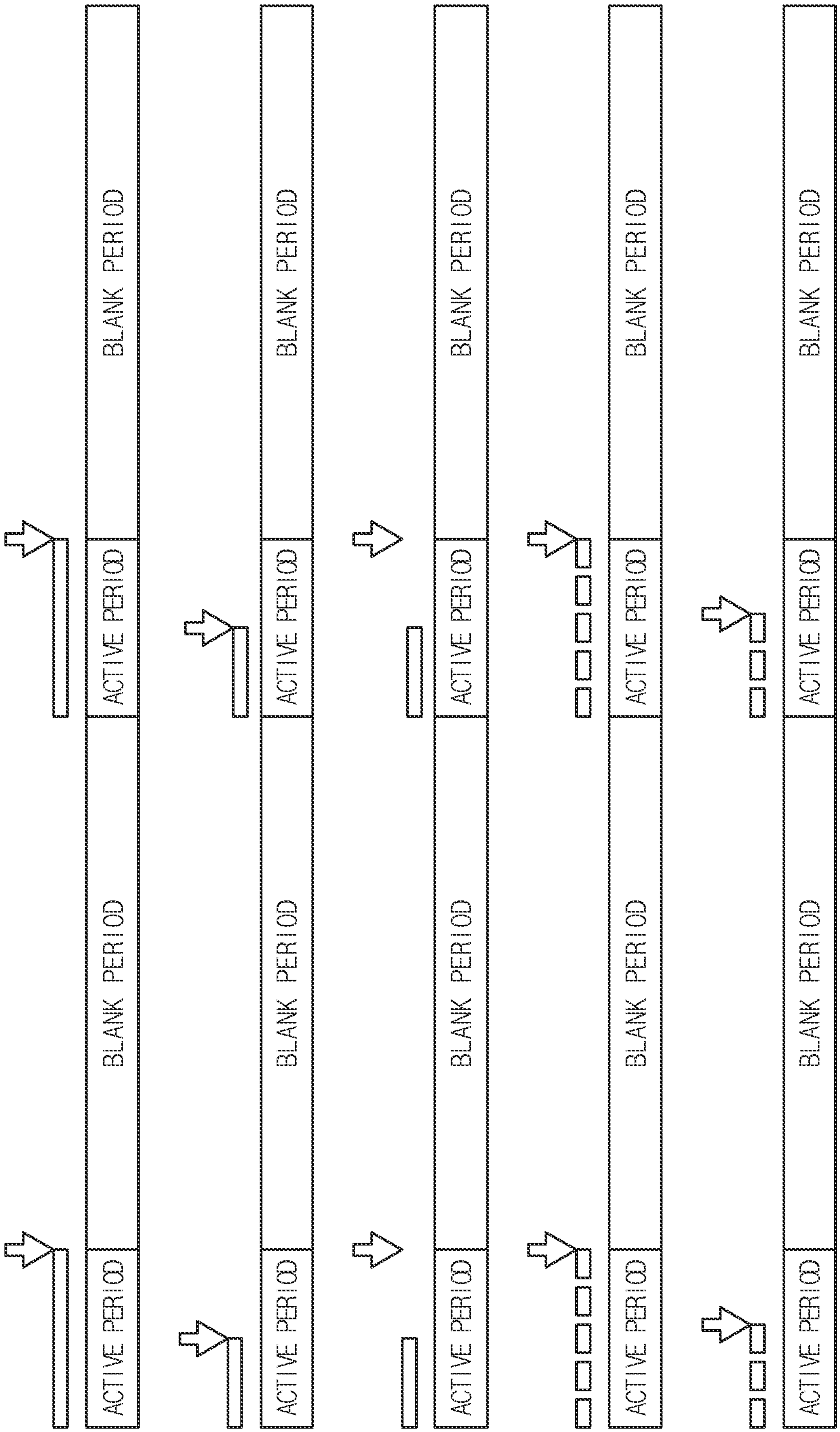
FIG. 8 is a diagram illustrating a setting time and an application time of a compensation value.

FIG. 8 is a diagram illustrating a setting time and an application time of a compensation value.

Referring to FIGS. 1 to 8, the driving controller 200 may compare the number of the first pulses and the number of the second pulses, which are measured in the active period of the frame period, with the first reference value, which is the number of the first pulses during the reference period of the second clock signal, and the second reference value, which is the number of the second pulses during the one horizontal time, set the compensation value of the number of the second pulses, and compensate for the second clock signal by adjusting the number of the second pulses existing in the one horizontal time based on the compensation value in the vertical blank period.

In an embodiment, the driving controller 200 may compare the number of the first pulses and the number of the second pulses, which are measured in the active period, with the first reference value and the second reference value. The driving controller may compensate for the second clock signal by adjusting the number of the second pulses existing in the one horizontal time when the vertical blank period starts.

In an embodiment, the driving controller 200 may divide the active period into reference times, and compare an average value of the number of the first pulses measured in the active period and an average value of the number of the second pulses measured in the active period with the first reference value and the second reference value. The driving controller 200 may compensate for the second clock signal by adjusting the number of the second pulses existing in the one horizontal time when the vertical blank period starts.

In an embodiment, the driving controller 200 may divide the active period into the reference times, and compare the number of the first pulses measured in a last reference time among the reference times and the number of the second pulses measured in the last reference time among the reference times with the first reference value and the second reference value. In this case, the driving controller 200 may compensate for the second clock signal by adjusting the number of the second pulses existing in the one horizontal time when the vertical blank period starts.

In an embodiment, the driving controller 200 may compare the number of the first pulses and the number of the second pulses, which are measured in a part of the active period, with the first reference value and the second reference value. In this case, the driving controller 200 may compensate for the second clock signal by adjusting the number of the second pulses existing in the one horizontal time when the part of the active period ends. In such an embodiment, the driving controller 200 may compensate for the second clock signal by adjusting the number of the second pulses existing in the one horizontal time when the vertical blank period starts.

In an embodiment, the driving controller 200 may divide the part of the active period into the reference times, and compare the average value of the number of the first pulses measured in the part of the active period and the average value of the number of the second pulses measured in the part of the active period with the first reference value and the second reference value. The driving controller 200 may compensate for the second clock signal by adjusting the number of the second pulses existing in the one horizontal time when the part of the active period ends.

In an embodiment, the driving controller 200 may divide the part of the active period into the reference times, and compare the number of the first pulses measured in the last reference time among the reference times and the number of the second pulses measured in the last reference time among the reference times with the first reference value and the second reference value. In this case, the driving controller 200 may compensate for the second clock signal by adjusting the number of the second pulses existing in the one horizontal time when the part of the active period ends.

Accordingly, in such an embodiment, the driving controller 200 may prevent an unintended change in luminance that may occur when the first clock signal and the second clock signal are not synchronized with each other, the driving frequency of the display panel 100 is not constant, and the intervals between the third pulses are thereby not constant, from being perceived by a viewer, by adjusting the number of the second pulses existing in the one horizontal time, such that the display quality of the display panel 100 may be enhanced.

FIG. 9 is a diagram illustrating an example in which the display device of FIG. 1 performs the compensation of the second clock signal according to a lookup table.

Referring to FIGS. 1 to 9, the driving controller 200 may compensate for the second clock signal by adjusting the number of the second pulses during the one horizontal time based on the compensation value in the lookup table.

In an embodiment, the driving controller 200 may compare the number of the first pulses and the number of the second pulses, which are measured in the active period of the frame period, with the first reference value, which is the number of the first pulses during the reference period of the second clock signal, and the second reference value, which is the number of the second pulses during the one horizontal time, and set the compensation value of the number of the second pulses based on the number of the first pulses. In such an embodiment, the driving controller 200 may compensate for the second clock signal by adjusting the number of the second pulses existing in the one horizontal time based on the compensation value in the lookup table for a difference ratio of the number of the first pulses during the reference period of the second clock signal measured in the active period and the first reference value. In an embodiment, for example, when the difference ratio is 3.0%, the number of second pulses during the one horizontal time may be compensated by adjusting the number of second pulses existing in the one horizontal time by –3.0% based on the lookup table.

Accordingly, in such an embodiment, the driving controller 200 may prevent an unintended change in luminance that may occur when the first clock signal and the second clock signal are not synchronized, the driving frequency of the display panel 100 is not constant, and the intervals between the third pulses are thereby not constant from being perceived by a viewer, by adjusting the number of the second pulses existing in the one horizontal time such that the display quality of the display panel 100 may be enhanced.

Figure 10:
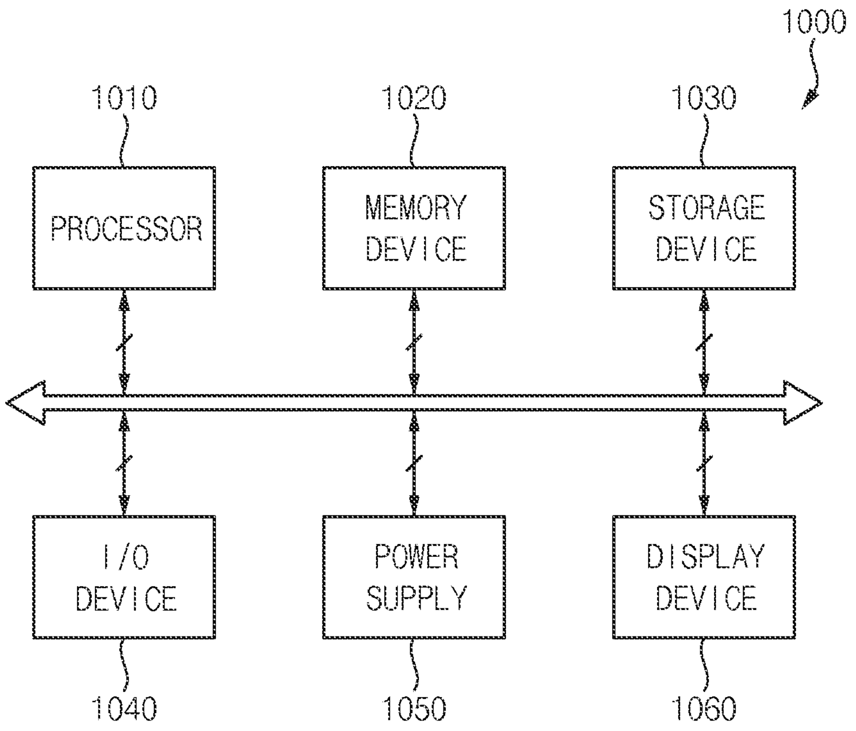
FIG. 10 is a block diagram illustrating an electronic device according to embodiments.
Figure 11:
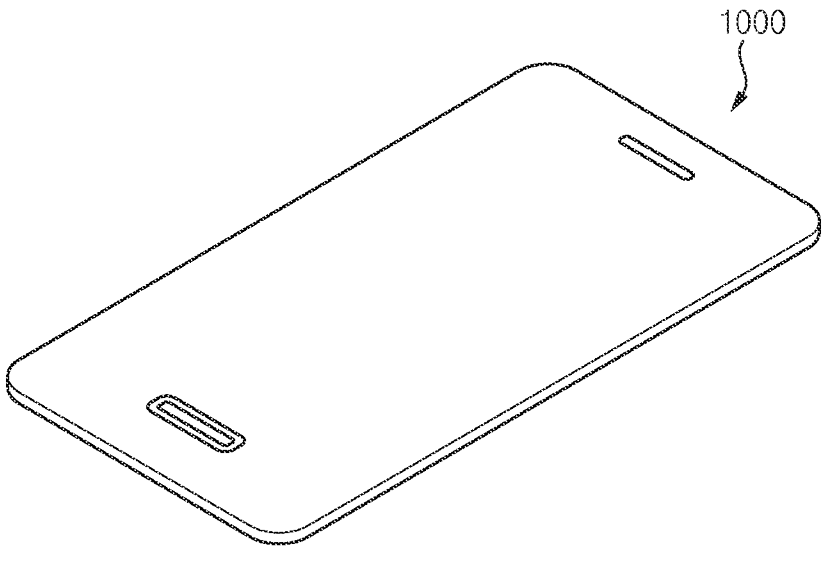
FIG. 11 is a diagram illustrating an example in which the electronic device of FIG. 10 is implemented as a smart phone.

FIG. 10 is a block diagram illustrating an electronic device 1000 according to embodiment of the invention. FIG. 11 is a diagram illustrating an example in which the electronic device 1000 of FIG. 10 is implemented as a smart phone.

Referring to FIGS. 10 and 11, an embodiment of the electronic device 1000 may include a processor 1010, a memory device 1020, a storage device 1030, an input/output (I/O) device 1040, a power supply 1050, and a display device 1060. The display device 1060 may be the display device 100 of FIG. 1. In addition, the electronic device 1000 may further include a plurality of ports for communicating with a video card, a sound card, a memory card, a universal serial bus (USB) device, other electronic device, and the like.

In an embodiment, as illustrated in FIG. 11, the electronic device 1000 may be implemented as a smart phone. However, the electronic device 1000 is not limited thereto. In an embodiment, for example, the electronic device 1000 may be implemented as a cellular phone, a video phone, a smart pad, a smart watch, a tablet personal computer (PC), a car navigation system, a computer monitor, a laptop, a head mounted display (HMD) device, or the like.

The processor 1010 may perform various computing functions. The processor 1010 may be a micro processor, a central processing unit (CPU), an application processor (AP), or the like. The processor 1010 may be coupled to other components via an address bus, a control bus, a data bus, or the like. Further, the processor 1010 may be coupled to an extended bus such as a peripheral component interconnection (PCI) bus. The memory device 1020 may store data for operations of the electronic device 1000. In an embodiment, for example, the memory device 1020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like and/or at least one volatile memory device such as a dynamic random access memory (DRAM) device, a static random access memory (SRAM) device, a mobile DRAM device, and the like. The storage device 1030 may include a solid state drive (SSD) device, a hard disk drive (HDD) device, a CD-ROM device, or the like. The I/O device 1040 may include an input device such as a keyboard, a keypad, a mouse device, a touch-pad, a touch-screen, and the like, and an output device such as a printer, a speaker, or the like. In some embodiments, the I/O device 1040 may include the display device 1060. The power supply 1050 may provide power for operations of the electronic device 1000.

Embodiments of the invention may be applied to any display device and any electronic device including a display panel, for example, a mobile phone, a smart phone, a tablet computer, a digital television (TV), a three-dimensional (3D) TV, a PC, a home appliance, a laptop computer, a personal digital assistant (PDA), a portable multimedia player (PMP), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a driving controller which generates a second clock signal having second pulses in response to a first clock signal having first pulses from an external device;

a display panel including pixels; and an emission driver which generates an emission signal having third pulses in response to the second clock signal and applies the emission signal to the pixels;

wherein the driving controller compares a number of the first pulses and a number of the second pulses, which are measured in an active period of a frame period, with a first reference value, which is the number of the first pulses during a reference period of the second clock signal, and a second reference value, which is the number of the second pulses during one horizontal time of the second clock signal, and sets a compensation value of the number of the second pulses, and wherein the driving controller compensates for the second clock signal by adjusting the number of the second pulses existing in the one horizontal time in a vertical blank period of the frame period based on the compensation value.

2. The display device of claim 1, wherein the driving controller compares the number of the first pulses and the number of the second pulses, which are measured in a part of the active period, with the first reference value and the second reference value.

3. The display device of claim 2, wherein the driving controller compensates for the second clock signal by adjusting the number of the second pulses existing in the one horizontal time when the part of the active period ends.

4. The display device of claim 2, wherein the driving controller compensates for the second clock signal by adjusting the number of the second pulses existing in the one horizontal time when the vertical blank period starts.

5. The display device of claim 1, wherein the driving controller compares the number of the first pulses and the number of the second pulses, which are measured in the active period, with the first reference value and the second reference value.

6. The display device of claim 5, wherein the driving controller compensates for the second clock signal by adjusting the number of the second pulses existing in the one horizontal time when the vertical blank period starts.

7. The display device of claim 1, wherein the driving controller divides the active period into reference times, and compares the number of the first pulses in the active period corresponding to an average value of the number of the first pulses measured in each of the reference times and the number of the second pulses in the active period corresponding to an average value of the number of the second pulses measured in each of the reference times with the first reference value and the second reference value.

8. The display device of claim 7, wherein the driving controller compensates for the second clock signal by adjusting the number of the second pulses existing in the one horizontal time when the vertical blank period starts.

9. The display device of claim 1, wherein the driving controller divides the active period into reference times, and compares the number of the first pulses in the active period corresponding to the number of the first pulses measured in a last reference time among the reference times and the number of the second pulses in the active period corresponding to the number of the second pulses measured in the last reference time among the reference times with the first reference value and the second reference value.

10. The display device of claim 9, wherein the driving controller compensates for the second clock signal by adjusting the number of the second pulses existing in the one horizontal time when the vertical blank period starts.

11. The display device of claim 1, wherein the driving controller divides a part of the active period into reference times, and compares the number of the first pulses in the active period corresponding to an average value of the number of the first pulses measured in each of the reference times and the number of the second pulses in the active period corresponding to an average value of the number of the second pulses measured in each of the reference times with the first reference value and the second reference value.

12. The display device of claim 11, wherein the driving controller compensates for the second clock signal by adjusting the number of the second pulses existing in the one horizontal time when the part of the active period ends.

13. The display device of claim 1, wherein the driving controller maintains intervals between the third pulses constant by adjusting the number of the second pulses existing in the one horizontal time.

14. The display device of claim 1, wherein the driving controller compensates for the second clock signal by adjusting the number of the second pulses existing in the one horizontal time by comparing the number of the first pulses and the number of the second pulses, which are measured in the active period for a same amount of time, with the first reference value and the second reference value.

15. The display device of claim 1, wherein the driving controller sets the compensation value by comparing the number of the first pulses and the number of the second pulses with the first reference value and the second reference value based on the number of the first pulses or the number of the second pulses.

16. The display device of claim 1, wherein the driving controller compensates for the second clock signal by adjusting the number of second pulses existing in the one horizontal time based on the compensation value in a lookup table.

17. A method of driving a display device, the method comprising:

setting a first reference value and a second reference value;

measuring a number of first pulses of a first clock signal and a number of second pulses of a second clock signal in an active period of a frame period;

setting a compensation value by comparing the number of the first pulses and the number of the second pulses with the first reference value and the second reference value; and compensating for the second clock signal by adjusting the number of the second pulses existing in one horizontal time in a vertical blank period of the frame period based on the compensation value.

18. The method of claim 17, wherein intervals between third pulses of an emission signal generated in response to the second clock signal are maintained constant by adjusting the number of the second pulses existing in the one horizontal time.

19. The method of claim 17, wherein the compensating for the second clock signal by adjusting the number of the second pulses existing in one horizontal time comprises comparing the number of the first pulses and the number of the second pulses, which are measured in the active period for a same amount of time, with the first reference value and the second reference value.

20. The method of claim 17, wherein the setting the compensation value comprises comparing the number of the first pulses and the number of the second pulses with the first reference value and the second reference value based on the number of the first pulses or the number of the second pulses.

* * * * *